(12) United States Patent
Maeda et al.

(10) Patent No.: US 6,338,917 B1
(45) Date of Patent: Jan. 15, 2002

(54) ALKALINE STORAGE BATTERY

(75) Inventors: Akihiro Maeda, Moriguchi; Hirokazu Kimiya, Kyoto; Yoshio Moriwaki, Hirakata; Isao Matsumoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/201,843

(22) Filed: Dec. 1, 1998

(30) Foreign Application Priority Data

Dec. 11, 1997 (JP) ............................................. 9-341123

(51) Int. Cl.$^7$ ........................ H01M 4/32; H01M 4/52; H01M 4/58

(52) U.S. Cl. ..................... 429/223; 429/218; 429/218.1; 429/245

(58) Field of Search ............................... 429/223, 218, 429/218.1, 245; 420/900

(56) References Cited

U.S. PATENT DOCUMENTS 4,039,729 A * 8/1977 Benczur-Urmossy et al. .... 429/206
4,555,317 A * 11/1985 Nicolas et al. ............... 204/129

(List continued on next page.)

FOREIGN PATENT DOCUMENTS

| EP | 0634804 | 1/1995 | |
| EP | 0727835 | 8/1996 | |
| EP | 0794584 | 9/1996 | |
| EP | 0738017 A1 * | 10/1996 | ................ 429/223 |
| EP | 0738017 | 10/1996 | |
| EP | 0738017 A1 * | 10/1996 | ................ 429/233 |
| EP | 0794584 A1 * | 9/1997 | ................ 429/223 |
| EP | 0817291 | 1/1998 | |
| EP | 0833397 A1 * | 1/1998 | ................ 429/233 |
| EP | 0833397 | 4/1998 | |
| EP | 0853346 A1 * | 7/1998 | ................ 429/233 |
| EP | 0853346 A1 * | 7/1998 | ................ 429/233 |
| EP | 0853346 | 7/1998 | |
| JP | 528992 | 2/1993 | |
| JP | 8329937 | 12/1996 | |

OTHER PUBLICATIONS

European Search Report dated Apr. 22, 1999.

(List continued on next page.)

*Primary Examiner*—Tom Dunn
*Assistant Examiner*—L. Edmondson
(74) *Attorney, Agent, or Firm*—Stevens, Davis, Miller & Mosher, LLP

(57) ABSTRACT

A nickel positive electrode including an active material mixture mainly composed of a nickel oxide and an electrically conductive support, a metal and/or an oxide thereof including elements effective for increasing oxygen overvoltage, preferably at least one element selected from Ca, Ti, Nb, Cr, Y and Yb is contained in a conducting agent such as metallic Co and/or Co oxide added to supplement the electrical conductivity of the active material. By virtue of this construction, the decrease of charging efficiency caused by increase of battery temperature and decrease of the oxygen overvoltage with charging of the battery can be inhibited and the charging efficiency can be improved in a wide temperature atmosphere. Thus, a nickel-metal hydride storage battery of high capacity can be provided.

3 Claims, 3 Drawing Sheets

U.S. PATENT DOCUMENTS

| | | | | |
|---|---|---|---|---|
| RE34,752 | E | * 10/1994 | Oshitani et al. | 429/223 |
| 5,366,831 | A | * 11/1994 | Watada et al. | 429/223 |
| 5,466,543 | A | * 11/1995 | Ikoma et al. | 429/59 |
| 5,501,922 | A | * 3/1996 | Li et al. | 429/218 |
| 5,506,076 | A | * 4/1996 | Miyamoto et al. | 429/223 |
| 5,523,182 | A | * 6/1996 | Ovshinsky et al. | 429/223 |
| 5,549,992 | A | * 8/1996 | Iwane et al. | 429/223 |
| 5,654,115 | A | * 8/1997 | Hasebe et al. | 429/218 |
| 5,744,258 | A | * 4/1998 | Bai | 429/3 |
| 5,759,718 | A | * 6/1998 | Yao et al. | 429/223 |
| 5,827,494 | A | * 10/1998 | Yano et al. | 423/594 |
| 5,965,295 | A | * 10/1999 | Bando et al. | 429/223 |
| 5,968,684 | A | * 10/1999 | Hayashi et al. | 429/223 |
| 6,007,946 | A | * 12/1999 | Yano et al. | 429/223 |
| 6,013,390 | A | * 1/2000 | Kimiya et al. | 429/206 |
| 6,027,834 | A | * 2/2000 | Hayashi et al. | 429/223 |
| 6,040,087 | A | * 3/2000 | Kawakami | 429/218.1 |
| 6,042,753 | A | * 3/2000 | Izumi et al. | 252/521.2 |

OTHER PUBLICATIONS

Chemical Abstracts, vol. 128, No. 13, Mar. 30, 1998, Columbus, Ohio, US, abstract No. 156625, Watada, Shoji, et al., "Nickel Hydroxide Cathode Active Mass Having Cobalt Compound Coatings for Alkaline Storage Batteries, Their Preparation, and Same Battery Cathodes," XP002098989 & Patent Abstract of Japan, vol. 98, No. 5, Apr. 30, 1998, JP 10–021901A (Yuasa Battery Corp), Jan. 23, 1998 & JP 10–012901 A (Yuasa Battery Co., Ltd., Japan; Tanaka Kagaku Kenkyusho K.K.).

Patent Abstracts of Japan, vol. 98, No. 10, Aug. 31, 1998, JP 10–125318A (Matsushita Electric Industrial Co., Ltd.), May 15, 1998 & Chemical Abstracts, vol. 129, No. 5, Aug. 3, 1998, Columbus, Ohio, US, abstract No. 56524, Okada, Ikuhiro, et al., "Nickel Hydroxide–Based Cathode Active Mass of Alkaline Storage Batteries Showing High Charging Efficiency at High Temperature and Same Cathodes," XP002098990.

Patent Abstracts of Japan, vol. 97, No. 4, Apr. 30, 1997, JP 8–329937A (Matsushita Electric Industrial Co., Ltd.), Dec. 13, 1996.

Patent Abstracts of Japan, vol. 96, No. 2, Feb. 29, 1996, JP 7–272722A (Shin Kobe Electric Mach Co., Ltd.), Oct. 20, 1995.

* cited by examiner

ALKALINE STORAGE BATTERY

BACKGROUND OF THE INVENTION

1. Field of the Invention

The present invention relates to an alkaline storage battery using a nickel oxide as a positive electrode, and is suitably applicable to Ni/MH storage batteries using a hydrogen-absorbing alloy capable of electrochemically absorbing and releasing hydrogen as a negative electrode.

2. Descriptiom of Related Art

Recently, with the spread of portable equipment, demand for small secondary batteries has increased. Among them, nickel-cadmium storage batteries using a nickel oxide as a positive electrode and an aqueous alkaline solution as an electrolyte and alkaline storage batteries such as nickel-metal hydride storage batteries have been in great demand because of their merits in cost, energy density and durability.

Of these batteries, the alkaline storage batteries have been able to be further increased in capacity than nickel-cadmium storage batteries by using hydrogen-absorbing alloys capable of electrochemically absorbing and releasing hydrogen as negative electrodes. Positive electrodes of alkaline storage batteries industrialized at present use active materials mainly composed of a nickel oxide. The present invention relates to this nickel positive electrode, and the following explanation is based on nickel-metal hydride storage batteries as a specific example.

One of the problems which must be solved for improving performances of nickel-metal hydride storage batteries is reduction of charging efficiency at high temperatures caused by generation of heat at the time of charging. That is, in nickel-metal hydride storage batteries, sealing of batteries is attempted by using a reaction which returns to water the oxygen gas generated by a decomposition reaction of water taking place competitively with oxidation (charging) of nickel hydroxide at the time of charging by reducing the oxygen gas with hydrogen contained in the hydrogen-absorbing alloy of negative electrode. For this reason, because of the rising temperature in the battery caused by the heat generated by the reaction, oxygen overvoltage of the nickel positive electrode decreases and energy used for oxidation reaction (charging reaction) of nickel hydroxide decreases to cause sharp reduction of charging efficiency. This phenomenon occurs similarly at the time of charging at high temperatures and also causes deterioration of charging efficiency, resulting in decrease of battery capacity.

Furthermore, the large-sized alkaline storage batteries for electric vehicles which have been developed and partially put to practical use from the viewpoint of environmental protection cannot ensure a battery surface area (radiating surface) which is proportioned to the capacity, and due to the inferior radiating performance, the rise of temperature in the batteries as mentioned above is conspicuous as compared with small-sized batteries. Thus, the above problem becomes more serious.

In order to solve the problems in charging at high temperatures, many proposals to improve charging efficiency at high temperatures have been made.

For example, one of the proposals is to add at least one of the materials having the effect of increasing oxygen overvoltage, such as yttrium, indium, antimony, barium, calcium and beryllium to the surface of active material powders or between the powders (JP-A-5-28992) and another is to similarly add powders of compound of at least one element selected from the group consisting of Ca, Sr, Ba, Cu, Ag and Y which have an average particle size of less than ½ times the average particle size of nickel oxide which is an active material (JP-A-8-329937).

Moreover, it has been proposed to add elements having the effect of increasing oxygen overvoltage at the time of charging, such as Ca and Cr in the state of solid solution, to nickel hydroxide which is a positive electrode active material.

BRIEF SUMMARY OF THE INVENTION

However, according to the methods disclosed in the above JP-A-5-28992,JP-A-8-329937 and others, the additives having the effect of increasing the oxygen overvoltage are apt to agglomerate in the positive electrode and the effect of addition is not necessarily sufficient for the amount of the additives. Furthermore, when the elements having the effect of increasing the oxygen overvoltage at charging are incorporated in the active material as a solid solution, the effective capacity of the positive electrode active material decreases according to the amount of the elements incorporated as a solid solution.

The present invention solves the above problems, and the object of the present invention is to provide an alkaline storage battery of high capacity by allowing the components having the effect of increasing oxygen overvoltage at charging to efficiently function to improve not only the charging efficiency at high temperatures, but also the charging efficiency at room temperature, thereby further enhancing discharge capacity of the battery.

For attaining the above object, according to the present invention, in an alkaline storage battery comprising a positive electrode mainly composed of a nickel oxide, a negative electrode, an alkaline electrolyte and a separator, a continuous electrically conductive network is formed of metallic Co and/or a Co oxide and a material having the effect of incearsing oxygen overvoltage on the surface of the nickel oxide of the positive electrode. Thus, dispersibility of the additive is improved to prevent the agglomeration seen in the conventional method, and the oxygen overvoltage is efficiently increased. Furthermore, there is provided an alkaline storage battery of high capacity which is improved in charging efficiency at high temperatures and increased in discharge capacity.

DETAILED DESCRIPTION OF THE INVENTION

Figure 1:
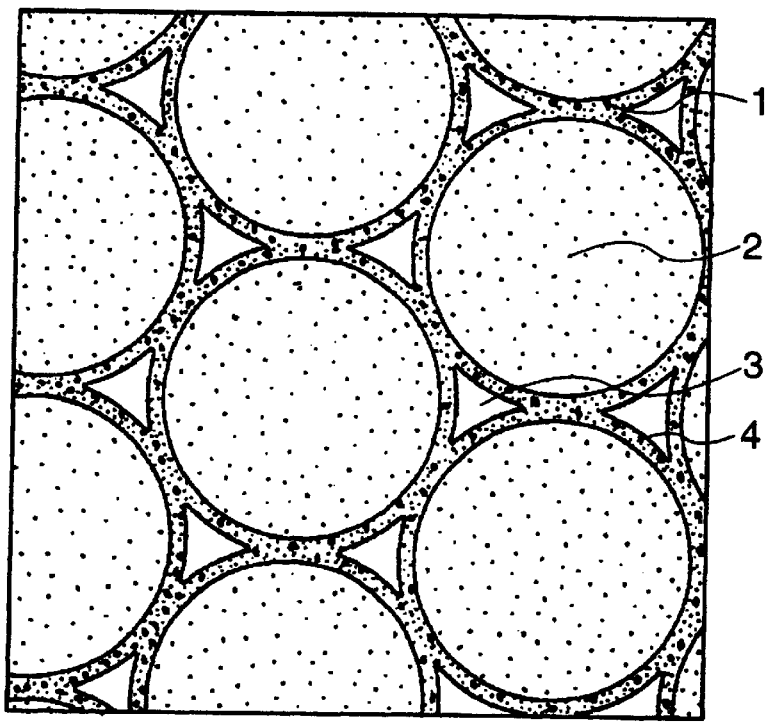
FIG. 1 schematically shows the disposition of the additive in the electrically conductive material in the powders of positive electrode active material.

The present invention provides an alkaline storage battery comprising a positive electrode mainly composed of a nickel oxide, a negative electrode, an alkaline electrolyte and a separator, wherein the surface of the nickel oxide powders is coated with an electrically conductive material, the nickel oxide powders are connected with each other by an electrically conductive network, and a material increasing an oxygen overvoltage is contained inside the electrically conductive material and/or in the vicinity of the surface of the electrically conductive material.

The surface of the Ni oxide powders is coated with an electrically conductive material so that an electrically conductive network can be obtained. The electrically conductive materials are preferably those which are mainly composed of metallic Co or Co oxides and are soluble in the alkaline electrolyte. Particle size is not limited, but the smaller size is preferred, and the average particle size is preferably 30 µm or less. The coating can be carried out by a mechanical kneading method or a reaction crystallizing method.

A material which increases the oxygen overvoltage is contained inside the electrically conductive material and/or in the vicinity of the surface of the electrically conductive material. In a typical embodiment, the material is a metal or oxide comprising at least one element selected from Ca, Ti, Nb, Cr, Y, Yb, In, Sb, Ba, Be, Ca, Sr and Ag, and in a preferred embodiment, the material is a metal or oxide comprising at least one element selected from Ca, Ti, Nb, Cr, Y and Yb. These materials are preferably contained in the state of solid solution or in the alloyed state. Content thereof is preferably 0.1–3% by weight, more preferably 0.3–1.5% by weight in terms of metal based on Ni in the nickel oxide which is a positive electrode active material.

The present invention is effective for general alkaline storage batteries using a nickel positive electrode, and especially effective for nickel-metal hydride storage batteries in which the negative electrode is a hydrogen-absorbing alloy. The technique of the present invention permits the additive to more effectively act as compared with conventional techniques, and has the effect of improving the characteristics of positive electrode and consequently improving battery performances.

The electrolyte is preferably mainly composed of aqueous potassium hydroxide solution and additionally contains sodium hydroxide in an amount of 5–50% by weight based on potassium hydroxide. By using such an electrolyte, advantageous effects include increasing oxygen overvoltage at charging and further promoting the effect to improve the charging efficiency.

EXAMPLES

Examples of the present invention will be explained. The examples never limit the invention.

Example 1

First, an explanation will be given of the results when performances of the battery of the present invention are compared with those of conventional batteries.

As additives, 2 g of ZnO and cobalt hydroxide containing 10% by weight of Co in terms of metal based on Ni in nickel hydroxide were used for 100 g of spherical nickel hydroxide (containing as solid solution 1.5% by weight of Co and 3% by weight of Zn in terms of metals based on Ni in nickel hydroxide) having an average particle size of 30 µm as an active material. In said cobalt hydroxide, Ca was dissolved as solid solution in an amount of 1.5% by weight in terms of metal based on Ni in the nickel hydroxide.

Water was added to the above mixture, followed by kneading to obtain a paste. A foamed nickel porous body was filled with the paste and formed into a given size (39 mm×75 mm×0.7 mm) by drying, pressing and cutting to prepare a positive electrode having a theoretical capacity of 1200 mAh when a one-electron reaction of Ni was taken as a standard.

An $MmNi_5$ hydrogen-absorbing alloy was used as the hydrogen-absorbing alloy of the negative electrode. Mm (Mm was a mixture of rare earth elements containing La, Ce, Nd, Sm, etc.) and Ni, Mn, Al and Co which were weighed at a given amount were mixed and molten by heating to obtain an alloy having the formula $MmNi_{3.9}Mn_{0.3}Al_{0.3}Co_{0.5}$. The resulting alloy was ground to an average particle size of 30 µm, and then the alloy powder was kneaded with an aqueous solution of polyvinyl alcohol (PVA) as a binder to prepare a paste. A foamed nickel porous body was filled with the paste and then pressed and cut to a given size (39 mm×100 mm×0.45 mm) to prepare a hydrogen-absorbing alloy negative electrode.

The resulting negative electrode was combined with the above positive electrode and 2 ml of an electrolyte comprising an aqueous potassium hydroxide solution having a specific gravity of 1.30 to which 40 g/l of lithium hydroxide was added was filled, followed by sealing to make a sealed nickel-metal hydride storage battery of AA size having a theoretical capacity of 1200 mAh on the basis of positive electrode capacity. This was called battery A of the present invention.

For the comparison on performances with the battery of the present invention, a battery was made which had the same construction as of the battery A of the present invention, except that spherical Ca-substituted nickel hydroxide in which, in addition to Co and Zn, Ca was dissolved in the state of solid solution in an amount of 1.5% by weight in terms of metal based on Ni in the nickel hydroxide powder was used as the active material and Ca was not present in cobalt hydroxide. The resulting battery was called battery B of comparative example.

Furthermore, a battery was made which had the same construction as the battery A of the present invention, except that Ca was added as calcium hydroxide to cobalt hydroxide not as a solid solution in an amount of 1.5% by weight in terms of metal based on Ni in the nickel hydroxide powder. The resulting battery was called battery C of comparative example.

Moreover, a battery was made which had the same construction as the battery A of the present invention, except that no Ca was added. The resulting battery was called battery D of comparative example.

The above batteries A, B, C and D were left to stand at 45° C. for 24 hours after filling with the electrolyte and sealing of the batteries to accelerate dissolution of Co species for the formation of an electrically conductive network. Thereafter, charging was carried out at 120 mA for 15 hours at a constant temperature of 20° C., and then discharging was carried out at 240 mA and at the same temperature as above with a cut-off voltage of 0.8 V, and this charging and discharging operation was repeated five times.

Then, these batteries were subjected to a charge and discharge test.

First, charging was carried out at 120 mA for 15 hours at a constant temperature of 20° C., and after suspension for 1 hour, discharging was carried out at 240 mA until the battery voltage reached 0.8 V, and discharged ampere-hour at that time was measured and this was referred to as discharge capacity ①.

Furthermore, charging was carried out at 120 mA for 15 hours at a constant temperature of 45° C., and after suspension for 1 hour, discharging was carried out at 240 mA and at 20° C. until the battery voltage reached 0.8 V, and discharged ampere-hour at that time was measured and this was referred to as discharge capacity ②.

Further, charging was carried out at 120 mA for 15 hours at a constant temperature of 20° C., and after suspension for 1 hour, discharging was carried out at 1200 mA until the battery voltage reached 0.8 V, and discharged ampere-hour at that time was measured and this was referred to as discharge capacity ③.

Table 1 shows the results of the charge and discharge test as utilization ratios. The utilization ratio is defined as an indication of the quantity of discharging in respect to theoretical capacity which is calculated on the basis of one-electron reaction of Ni and the utilization ratio is calculated by the formula: utilization ratio (%)=discharge capacity/theoretical capacity×100. Utilization ratio ① corresponding to the discharge capacity ① utilization ratio ② corresponding to the discharge capacity ② and utilization ratio ③ corresponding to the discharge capacity ③ are employed.

TABLE 1

Results of charge and discharge test

|           | Utilization ratio ① | Utilization ratio ② | Utilization ratio ③ | 45° C. Charging efficiency | High rate discharging efficiency |
|-----------|---------------------|---------------------|---------------------|----------------------------|----------------------------------|
| Battery A | 105%                | 88%                 | 96%                 | 83.8%                      | 91.4%                            |
| Battery B | 100%                | 75%                 | 92%                 | 75.0%                      | 92.0%                            |
| Battery C | 98%                 | 73%                 | 89%                 | 74.5%                      | 90.8%                            |
| Battery D | 98%                 | 63%                 | 90%                 | 64.3%                      | 91.8%                            |

The smaller difference between utilization ratio ① and utilization ratio ② means that the battery is superior in charging efficiency at high temperatures. If 45° C. charging efficiency (defined by 45° C. charging efficiency (%)= utilization ratio ②/utilization ratio ①×100) is obtained, that of the battery A of the present invention is 83.8% while that of the battery B of comparative example is 75.0%, that of the battery C of the comparative example is 74.5%, and that of the battery D of the comparative example is 64.3%, and thus it is recognized that the battery A of the present invention is markedly excellent in the charging efficiency at high temperatures.

Furthermore, it can be confirmed from the charge and discharge curve for the discharge capacity ① that the battery A of the present invention is higher in battery voltage in the overcharging region than the batteries B and C of the comparative examples.

This is due to the increase of the oxygen overvoltage, and it is considered that this is because Ca which is one of the components effective for the increase of the oxygen overvoltage is uniformly dispersed in the electrically conductive network on the surface of the active material and hence the oxygen overvoltage efficiently increases. It can be said that the charging efficiency is improved even at room temperature.

In order to confirm the above points, positive electrodes were taken out from the batteries A, B and C after being subjected to the charge and discharge tests and the sections of the positive electrodes were subjected to surface analysis (elemental mapping) by EPMA.

Figure 2:
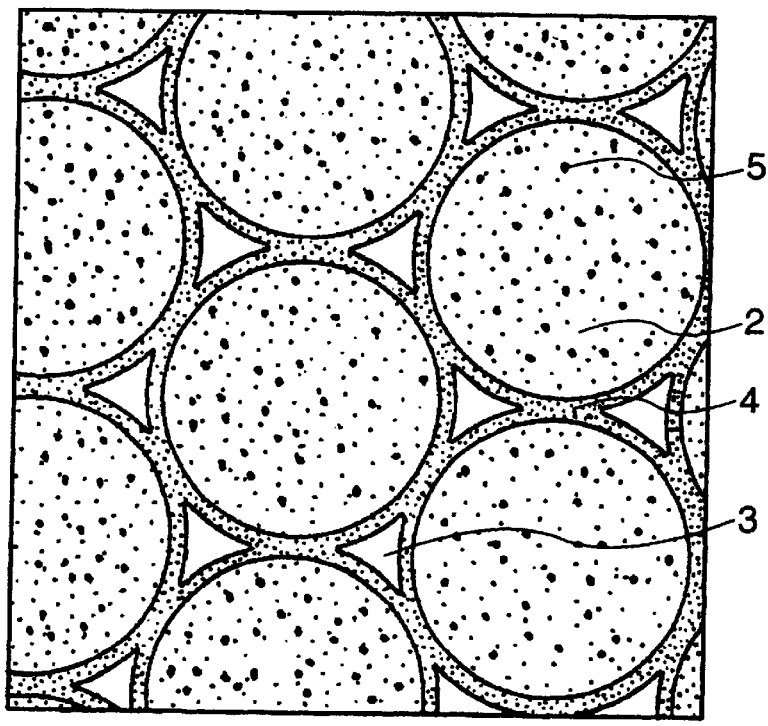
FIG. 2 schematically shows the disposition of the additive in the electrically conductive material when the additive is allowed to exist in spherical nickel hydroxide.
Figure 3:
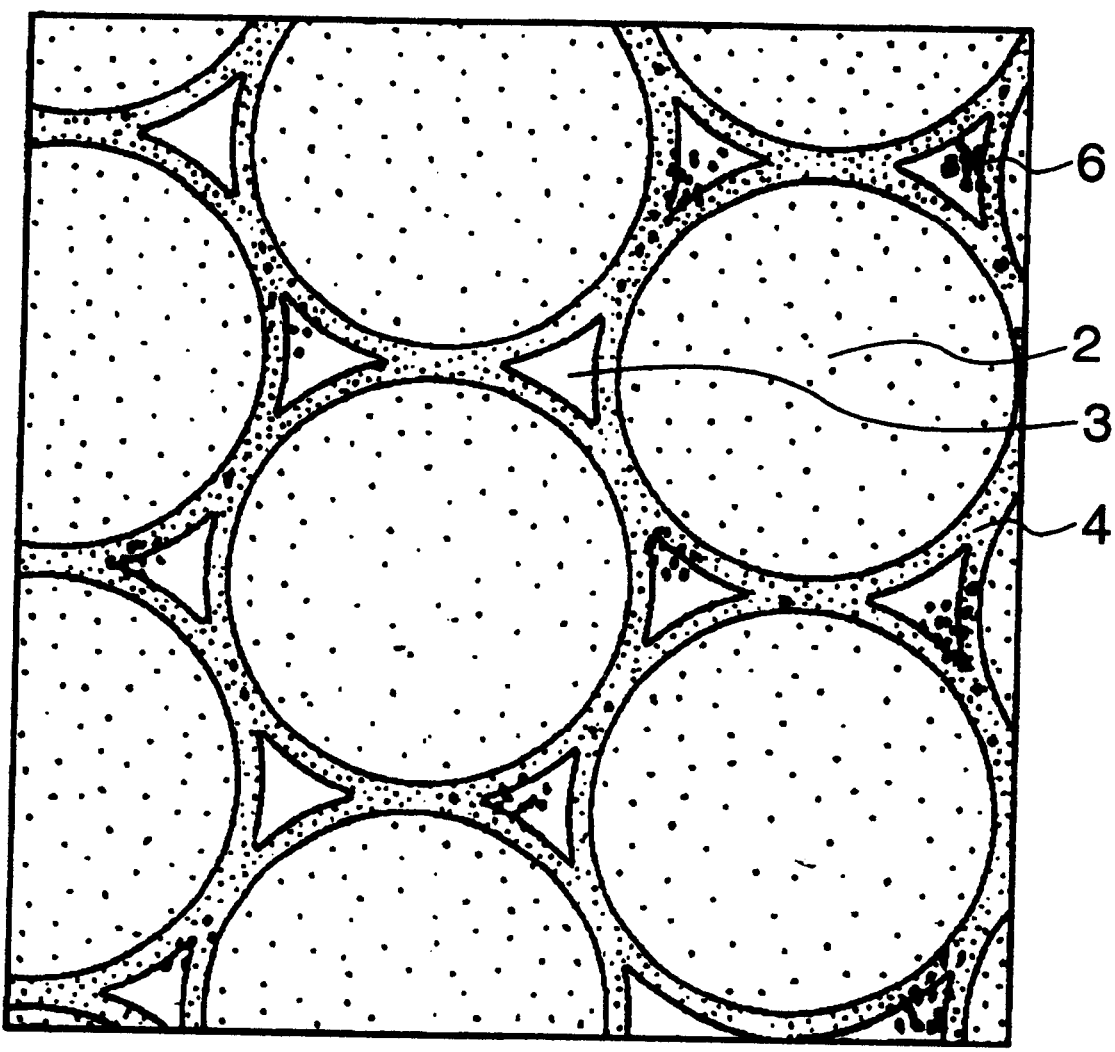
FIG. 3 schematically shows the disposition of the additive in the electrically conductive material when a conventional external addition method is employed.

In the positive electrode taken out from the battery A, Ca element was uniformly dispersed in the aggregation of Co element constituting the electrically conductive network formed around the active material and his was clearly different from the state of Ca being uniformly present in Ni element in the active material and being not present in the electrically conductive network of Co oxide as in the positive electrode of the battery B and the state of Ca element being agglomerated as in the positive electrode of the battery C. The following diagrams can be drawn based on the above information. FIG. 1 shows the states of the active material and the additive in the positive electrode of the battery A of the present invention, according to which the additive 1 (Ca dissolved in the form of solid solution) is uniformly dispersed in electrically conductive network 4 surrounding nickel hydroxide 2 which is an active material. In FIGS. 1, 3 indicates a void. FIGS. 2 and 3 show the states of the active material and the additive in the positive electrodes of the batteries B and C of the comparative examples, respectively. In FIG. 2, the additive 5 (Ca dissolved in the form of solid solution) is uniformly dispersed in active material 2, but is not present in the electrically conductive network 4. In FIGS. 2, 3 indicates a void. In FIG. 3, the additive 6 (mixed Ca) is agglomerated in the void 3 of the positive electrode other than the electrically conductive network 4 surrounding the active material 2.

Furthermore, when from the ratio of the utilization ratio ① and utilization ratio ③, high rate discharging efficiency (%) (defined by high rate discharging efficiency (%)= utilization ratio ③/utilization ratio ①×100) is obtained, that of the battery A of the present invention is 91.4% while that of the battery B is 92.0%, that of the battery C is 90.8%, and that of the battery D is 91.8%. The results mean that Ca in the electrically conductive network used in the battery A of the present invention does not hinder the charge transfer at the time of discharging.

Example 2

Metallic Co powder and metallic Ti powder were mixed at a weight ratio of 10:1.5, and the mixture was alloyed by melting with heating and subsequent superquenching. This Co—Ti alloy was ground to an average particle size of 10 μm. The Co—Ti alloy was weighed so that the amount of the metallic Co was 10% by weight based on Ni in nickel hydroxide which was active material. The following batteries were fabricated: The same battery as the battery A of the present invention in Example 1, except that said Co—Ti alloy was used in place of cobalt hydroxide in which calcium was dissolved in the form of solid solution, the same battery as the battery B of the comparative example in Example 1, except that in place of Ca, 1.5% by weight of Ti was dissolved in the form of solid solution in nickel hydroxide, and the same battery as the battery C of the comparative example in Example 1, except that $TiO_2$ containing Ti in an amount of 1.5% by weight in terms of metal based on Ni in nickel hydroxide was used in place of calcium hydroxide. These batteries were subjected to the same charge and discharge test as in Example 1 to find that as in Example 1, the battery of the present invention was improved by 5% or more in charging efficiency at high temperatures and room temperature as compared with the batteries of the comparative examples, and thus the effect of improvement in charging efficiency was recognized.

Example 3

Metallic Co and $Y_2O_3$ were mixed so as to give a ratio of Co:Y of 10:1.5, and an amorphous mixture was prepared by mechanical alloying. The mixture was weighed so that amount of the metallic Co was 10% by weight based on Ni in nickel hydroxide which was active material, and the following batteries were fabricated: The same battery as the battery A of the present invention in Example 1, except that the mixture was used in place of cobalt hydroxide in which calcium hydroxide was dissolved in the form of solid solution; the same battery as the battery B of the comparative example in Example 1, except that spherical nickel hydroxide in which in place of Ca, Y was dissolved in the form of solid solution in an amount of 1.5% by weight based on Ni in the nickel hydroxide; and the same battery as the battery C of the comparative example in Example 1, except that $Y_2O_3$ containing Y in an amount of 1.5% by weight in terms of metal based on Ni in nickel hydroxide was used in place of calcium hydroxide. These batteries were subjected to the same charge and discharge test as in Example 1 to find that as in Example 1, the battery of the present invention was improved by 5% or more in charging efficiency at high temperatures and room temperature as compared with the batteries of the comparative example, and thus the effect of improvement in charging efficiency was recognized.

Example 4

Batteries having the same construction as of the battery A of the present invention, except for using electrolytes containing 3, 5, 20, 40, 50 and 60% by weight of sodium hydroxide were fabricated and these were called battery 1, battery 2, battery 3, battery 4, battery 5 and battery 6. These batteries were subjected to the same charge and discharge test as in Example 1. The results are shown in FIG. 4.

Figure 4:
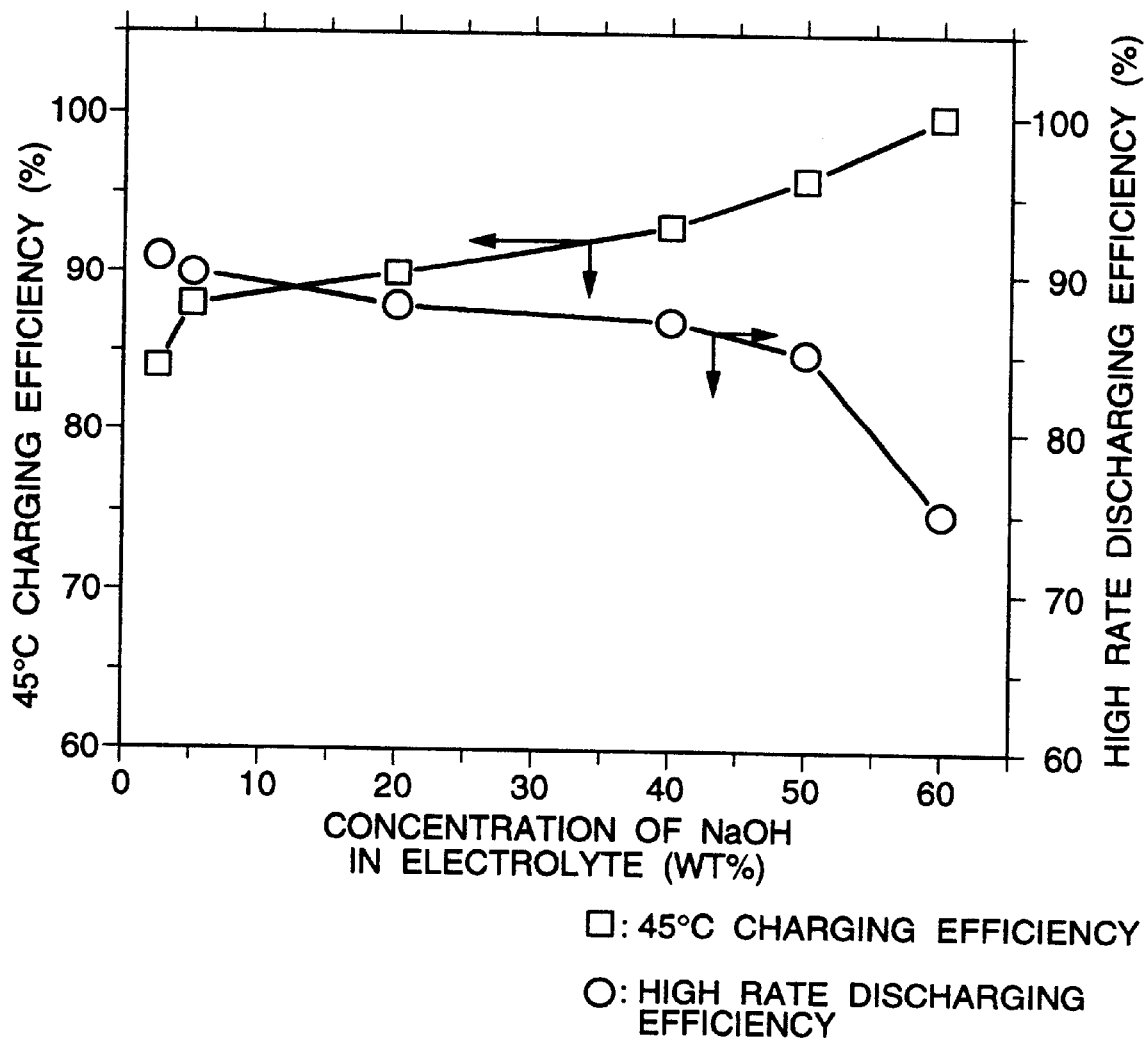
FIG. 4 is a graph which shows the relation between the charging efficiency at high temperatures and the utilization ratio of a battery in which Na is added to the electrolyte.

It can be seen from FIG. 4 that with increase of Na concentration in the electrolyte, the 45° C. charging efficiency is improved, but the high rate discharging efficiency is deteriorated.

It can be seen that in order to improve the 45° C. charging efficiency by 5% or more, at least 5% by weight of sodium hydroxide based on potassium hydroxide is necessary, and the high rate discharging efficiency decreases about 10% unless the amount of sodium hydroxide is 50% by weight or less and the discharge performances cannot be maintained.

The similar tendency was obtained when other element species (Ti, Nb, Cr, Y, Yb) were used. Furthermore, the same batteries as the battery D of the comparative example, except the electrolyte was changed, showed the similar tendency, but were lower in the effect.

It can be seen from the above that batteries which use an electrically conductive network containing at least one element selected from Ca, Ti, Nb, Cr, Y and Yb are further improved in charging efficiency when Na is present in the electrolyte.

It is confirmed from the above examples that the effect of the present invention can be obtained when at least one element selected from Ca, Ti, Nb, Cr, Y and Yb is present in the electrically conductive network comprising metallic Co and/or Co oxide, and good results can also be obtained when two or more of these elements are used. Furthermore, when the batteries of the present invention were subjected to a life test, they were not inferior to the conventional batteries and the increase of pressure in the batteries at charging was also not great as compared with the conventional batteries. It is confirmed from these results that the batteries of the present invention are not deteriorated in other battery characteristics.

The amount of Ca, Ti, Nb, Cr, Y and Yb added is preferably in the range of 0.1–3% in terms of metal based on Ni in nickel hydroxide for obtaining the effect of improving the charging efficiency and inhibiting agglomeration of the added component to form a satisfactory electrically conductive network of metallic Co and/or Co oxide. More preferabley, the range of the amount is 0.3–1.5%.

In the above examples, metallic Co or cobalt hydroxide was used as the materials forming the electrically. conductive network in the positive electrode, but the materials may be those which have Co as a main constitutive element and can be dissolved in an alkaline solution even in a slight amount, and the similar effect can be obtained using an oxide such as CoO. However, particle size of the materials is preferably as small as possible and is preferably 30 $\mu$m or less in average particle size.

Furthermore, in the above Examples, sealed nickel-metal hydride storage batteries were used, but it was recognized that the similar excellent effect could also be obtained using open nickel-metal hydride storage batteries.

Moreover, it was also confirmed in the present invention that when an electrolyte containing Na was used, not only the charging efficiency at high temperatures was improved, but also capacity recoverability after storage at high temperatures was improved.

As explained above, the present invention provides the advantageous effects that oxygen overvoltage at charging is efficiently increased, charging efficiency is improved, and charging of sufficient quantity of electricity can be performed even at high temperatures.

What is claimed is:

1. An alkaline storage battery comprising a positive electrode having an active material comprising mainly nickel oxide powders, a negative electrode, a separator, and an alkaline electrolyte, wherein (i) an electrically conductive material is coated on the surface of said nickel oxide powders, (ii) said nickel oxide powders are connected with each other through an electrically conductive network, and (iii) said coating of electrically conductive material comprises a material which increases an oxygen overvoltage, said material which increases an oxygen overvoltage being uniformly dispersed throughout the coating of electrically conductive material and/or in the vicinity of the surface of the coating of electrically conductive material, and wherein said material which increases the oxygen overvoltage is a metal and/or an oxide thereof comprising at least one element selected from the group consisting of Ca, Ti, Nb, Cr, Y, and Yb;

wherein said electrically conductive material comprises mainly metallic Co and/or Co oxide; and wherein said alkaline electrolyte comprises (i) mainly aqueous potassium hydroxide solution, and (ii) sodium hydroxide in an amount of 5–50% by weight based on said potassium hydroxide.

2. An alkaline storage battery according to claim 1, wherein said material which increases the oxygen overvoltage is (i) dissolved in the electrically conductive material in a state of solid solution or (ii) alloyed with said electrically conductive material, and wherein said material which increases the oxygen overvoltage is present in the range of 0.1–3% by weight in terms of metal based on Ni in the nickel oxide of the active material.

3. An alkaline storage battery according to claim 1, wherein the material which increases an oxygen overvoltage is dispersed throughout the coating of electrically conductive material.

* * * * *